Sept. 22, 1925.  
E. F. OETINGER  
TRANSMISSION BAND  
Filed Sept. 19, 1924  
1,554,689
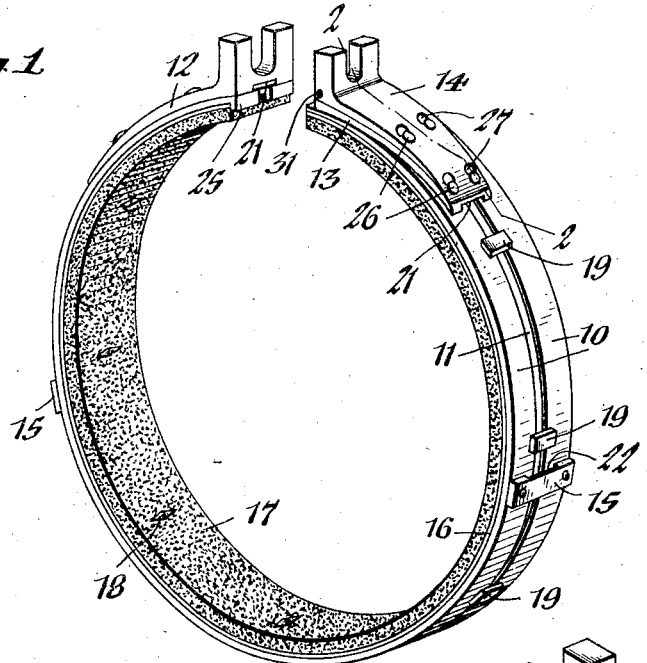
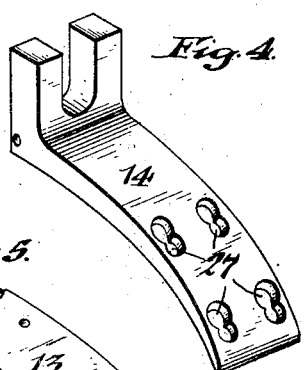
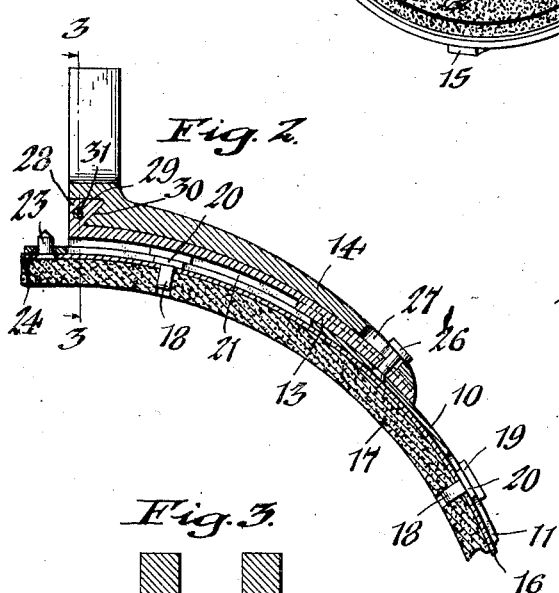
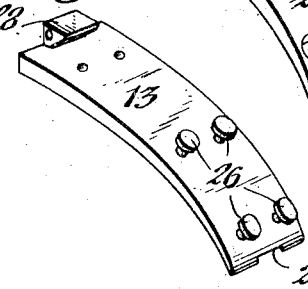
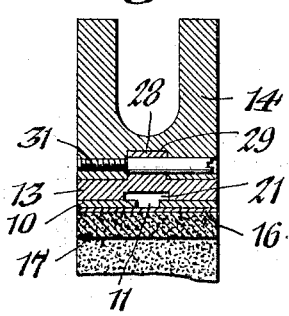
Inventor,  
Elmer F. Oetinger  
by Gifford Geyer  
Attorneys Patented Sept. 22, 1925.

1,554,689

UNITED STATES PATENT OFFICE.

ELMER F. OETINGER, OF BUFFALO, NEW YORK.

TRANSMISSION BAND.

Application filed September 19, 1924. Serial No. 738,683.

*To all whom it may concern:*

Be it known that I, ELMER F. OETINGER, a citizen of the United States, residing at Buffalo, in the county of Erie and State of New York, have invented new and useful Improvements in Transmission Bands, of which the following is a specification.

This invention relates to improvements in the transmission bands employed in connection with the planetary transmission mechanisms of automobiles.

One of its objects is to improve the construction of such bands with a view of permitting their ready and convenient application and removal to and from the brake drums.

Another object of this invention is to provide a sectional, demountable band of this character which can be readily assembled and dismembered.

In the accompanying drawings:

Figure 1 is a perspective view of a transmission band embodying my improvements. Figure 2 is an enlarged longitudinal section thereon on line 2—2, Fig. 1. Figure 3 is a transverse section on line 3—3, Fig. 2. Figures 4 and 5 are perspective views of the detachable coupling ear and its companion member, respectively.

Similar characters of reference indicate corresponding parts throughout the several views.

My improved transmission band comprises an outer supporting band or holder adapted to encircle a brake drum and composed of two sections 10, 10 arranged side by side in spaced relation to form an intervening circumferential guide channel or slot 11 between them. These sections are held in spaced relation at one end by a forked coupling ear 12 riveted or otherwise fastened thereto and at their other end by a tie or base-plate 13, which constitutes one of the complementary parts of a two-piece coupling ear, the other part being detachable and designated by the numeral 14. Intermediate their ends, the band-sections 10, 10 are held in proper spaced relation by tie-bars or cleats 15.

Removably carried by the supporting band is an inner or brake band consisting of a flexible metallic backing or strip 16 provided on its inner side with a renewable brake lining 17, of appropriate material, secured thereto by suitable fasteners 18 having substantially rectangular-shaped heads 19. The latter project beyond the outer side of the backing strip so that their shanks 20 engage the slot 11 between the band-sections 10, 10, while their heads bear against the adjoining marginal portions of the latter, as shown in Figs. 1 and 2. By this construction, the slot 11 and fasteners 18 form complementary guiding and interlocking devices for reliably clamping the inner and outer band members in place and yet permit the ready removal of the inner member from the outer one.

The undersides of the coupling ear 12 and the base plate 13 of the other coupling ear are provided with longitudinal grooves 21 extending from end to end thereof and the tie bars 15 are provided with similar grooves 22 for receiving the fastener-heads 19 during the act of applying or threading the inner band member to the outer band member.

In order to retain the inner member or band in place on the supporting member and prevent its circumferential displacement relative thereto, the backing strip 16 may be provided at one end with one or more radial studs 23 which are adapted to interlock with corresponding openings 24 formed in the adjoining ends of the band-sections 10, 10. The opposite ends of the latter have inwardly-facing stop flanges 25 which limit the circumferential movement of the liner in one direction and which also insure the proper registration of the studs with their interlocking openings.

When these bands, as a unit including both inner and outer members, are substituted for those now in use, it is preferred to have one of their coupling ears detachable, so that each band can be mounted on its drum by inserting it through the opening of the transmission case without the necessity of removing the latter. To this end, the base-plate 13 of the detachable ear is provided on its face with headed-coupling pins 26 while its companion member 14 has corresponding key-hole slots 27 arranged lengthwise thereof. At its front end, this base-plate has an outwardly-extending lug or projection 28, and on the underside of its corresponding end, the ear-member 14 has a recess or groove 29 for receiving said lug. The opposing end walls of the lug and recess are inclined, as shown at 30, whereby the detachable ear is held against outward displacement relative to its base-plate 13. A set screw 31 passing through the lug 28 and the adjoining portions of the ear-member 14 serves to reliably hold the latter against circumferential displacement on the base-plate. In removing the coupling ear from the latter, it is only necessary to remove the set screw and shift the same on its base plate to bring the heads of the coupling pins 26 in register with the enlarged portions of the slots 27, after which the ear can be freely lifted off the base-plate. In attaching the coupling ear to the band, a reversal of the steps just described is effected. It is to be understood that this detachable ear is only removed at the time of the first installation of the band on the drum. Thereafter, when the brake lining 17 becomes worn, it is only necessary to replace it with a new one, without removing the supporting band 10, 10 from the drum.

The removal of the worn liner is effected by springing the stud end of the flexible backing 16 inwardly to remove its studs 23 from the openings 24 in the outer band sections 10, 10, and then pulling the liner-backing outwardly until the same has been completely withdrawn from the outer band-sections. In replacing a new liner for the worn one, it is guided on the outer supporting member with its fasteners 18 engaging the slot 11 thereof and forced around said member until its free end encounters the stop flanges 25, after which the studs 23 are sprung into their corresponding openings 24.

I claim as my invention:

1. A transmission band of the character described, comprising a supporting member consisting of bands arranged side by side and spaced to form a circumferential slot between them, a removable lining member mounted on said supporting member and interlocking with said slot, and coupling members applied to the free ends of said bands for holding them in spaced relation, one of said coupling members being composed of two parts, one of which is detachable from the other.

2. A transmission band of the character described, comprising a supporting member consisting of bands arranged side by side and spaced to form a circumferential slot between them, a removable lining member mounted on said supporting member and interlocking with said slot, a coupling member mounted on one end of said supporting bands, a tie-plate mounted on the opposing end thereof, the coupling member and the tie-plate holding said bands in spaced relation, and a second coupling member detachably mounted on said tie-plate.

3. A transmission band of the character described, comprising a supporting member consisting of bands arranged side by side and spaced to form a circumferential slot between them, a removable lining member mounted on said supporting member and interlocking with said slot, a coupling member mounted on one end of said supporting bands, a tie-plate mounted on the opposing end thereof, the coupling member and the tie plate holding said bands in spaced relation, a second coupling member detachably connected to said tie-plate, and complementary locking devices on said last-named parts for holding the detachable coupling member against movement in all directions relative to the tie-plate.

4. A transmission band of the character described, comprising a supporting member consisting of bands arranged side by side and spaced to form a circumferential slot between them, a removable lining member mounted on said supporting member and interlocking with said slot, a coupling member mounted on one end of said supporting bands, a tie-plate mounted on the opposing end thereof and having an outwardly-facing lug thereon, and a second coupling member detachably mounted on said tie-plate and having a recess therein for receiving said lug.

5. A transmission band of the character described, comprising a supporting member consisting of bands arranged side by side and spaced to form a circumferential slot between them, a removable lining member mounted on said supporting member and interlocking with said slot, a coupling member mounted on one end of said supporting bands, a tie-plate mounted on the opposing end thereof and having headed-coupling pins near one end thereof and an outwardly-facing lug at its other end, a second coupling member detachably mounted on said tie-plate and having key-hole slots for receiving said coupling pins and a recess for receiving said lug, and a screw passing transversely through said lug and the adjoining portions of said second coupling member.

ELMER F. OETINGER.